(12) United States Patent
Rappoport et al.

(10) Patent No.: US 8,809,708 B2
(45) Date of Patent: Aug. 19, 2014

(54) BUTTON ASSEMBLY WITH DRIVE ASSEMBLY

(71) Applicant: Apple Inc., Cupertino, CA (US)

(72) Inventors: Benjamin M. Rappoport, San Francisco, CA (US); Kevin Gibbs, Menlo Park, CA (US); Patrick Kessler, San Francisco, CA (US); Derek W. Wright, San Francisco, CA (US); Alex Chun Lap Yeung, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/855,425

(22) Filed: Apr. 2, 2013

(65) Prior Publication Data

US 2013/0220789 A1   Aug. 29, 2013

Related U.S. Application Data

(62) Division of application No. 12/858,355, filed on Aug. 17, 2010, now Pat. No. 8,420,965.

(51) Int. Cl.
*H01H 1/34* (2006.01)
*H01H 13/7065* (2006.01)
*H01H 13/85* (2006.01)
*H01H 13/14* (2006.01)
*H01H 3/32* (2006.01)
*H04M 1/23* (2006.01)

(52) U.S. Cl.
CPC ....... *H01H 13/7065* (2013.01); *H01H 2215/02* (2013.01); *H01H 2221/032* (2013.01); *H01H 1/34* (2013.01); *H01H 2003/323* (2013.01); *H01H 13/85* (2013.01); *H01H 2215/002* (2013.01); *H01H 2215/006* (2013.01); *H01H 2217/024* (2013.01); *H04M 1/23* (2013.01); *H01H 13/14* (2013.01)
USPC .......................................... 200/249; 200/517

(58) Field of Classification Search
CPC ................... H01H 2221/032; H01H 2215/02; H01H 1/34; H01H 2003/323
USPC .......... 200/249, 251, 286, 287, 517, 515, 512
See application file for complete search history.

(56) References Cited

U.S. PATENT DOCUMENTS 1,575,903 A    3/1926 Dorsey
1,951,245 A *  3/1934 Jardine .......................... 200/251

(Continued)

FOREIGN PATENT DOCUMENTS

FR    2658486    8/1991
JP    2009063741  3/2009

OTHER PUBLICATIONS

Bersot, et al., "Adjustable Key Module," Originally disclosed by IBM on Jul. 1, 1978 UTC, Loaded into the IP.com Prior Art Database on (Feb. 21, 2005 UTC).

*Primary Examiner* — Felix O Figueroa
(74) *Attorney, Agent, or Firm* — Brownstein Hyatt Farber Schreck, LLP

(57) ABSTRACT

A process is provided for characterizing a tactile response of a first mechanical actuator (e.g., button) based on a back off distance. The first mechanical actuator may include a plunger, a dome-shaped flexible membrane, and an electrical contact, all aligned with each other so that a contact signal is generated when the flexible membrane touches the contact. The plunger can be moved a first distance towards the contact until the contact signal is generated at a contact point. Then the plunger can be backed off a second distance from the contact point. This second distance may be called the "back off distance". The particular feel of the first mechanical actuator can then be correlated to a particular back off distance. This process can be repeated a number of times to classify a number of different "feels" for the first mechanical actuator based on a number of different back off distances.

20 Claims, 18 Drawing Sheets

(56) References Cited

U.S. PATENT DOCUMENTS

| | | |
|---|---|---|
| 2,837,616 A | 6/1958 | Jaidinger |
| 3,303,306 A | 2/1967 | Fischer et al. |
| 3,746,820 A | 7/1973 | Holder, Jr. |
| 5,434,566 A | 7/1995 | Iwasa et al. |
| 6,271,491 B1 | 8/2001 | Ono et al. |
| 6,614,380 B1 | 9/2003 | Desai et al. |
| 2006/0123633 A1 | 6/2006 | Hauer |

* cited by examiner

BUTTON ASSEMBLY WITH DRIVE ASSEMBLY

CROSS-REFERENCE TO RELATED APPLICATIONS

This application is a divisional of co-pending, commonly-assigned U.S. patent application Ser. No. 12/858,355, filed on Aug. 17, 2010, the contents of which are hereby incorporated by reference in their entirety.

BACKGROUND

1. Field of the Invention

The invention relates to consumer products, and more particularly, methods and apparatuses for assembling the buttons of a consumer product using drive assembly.

2. Description of the Related Art

Buttons are common on consumer devices. While buttons come in many different shapes, sizes, and configurations, the "feel" of a button (i.e., the tactile response felt by the user when depressing the button) can vary as well, even among substantially similar button configurations. This is due to a number of different factors unrelated to the configuration of the button feature itself, including the type of configuration of the switch assembly, and the distance between the button feature and the switch assembly, sometimes referred to as the "slack", What is needed is a way to improve the feel of buttons in consumer devices.

SUMMARY

Broadly speaking, the embodiments disclosed herein describe a process for characterizing a tactile response of a first mechanical actuator (e.g., button) based on a back off distance. Specifically, the first mechanical actuator may include a plunger, a dome-shaped flexible membrane and an electrical contact, all aligned with each other so that a contact signal is generated when the flexible membrane (driven by the plunger) touches the contact. The plunger can be moved a first distance towards the contact until the contact signal is generated at a contact point. Then the plunger can be backed off a second distance from the contact point. This second distance may be called the "back off distance". The particular feel of the first mechanical actuator can then be correlated to a particular back off distance. This process can be repeated a number of times to classify a number of different "feels" for the first mechanical actuator based on a number of different back off distances.

At assembly time, various embodiments described herein may be provided that include a button assembly with a drive assembly that, when engaged, moves a switch closer to or further away from the button assembly. In one embodiment, the drive assembly is a screw drive including an adjustment screw, a screw block and a guide plate. The drive assembly may be utilized when assembling a portable consumer product to ensure a similar tactile response, i.e., feel, for multiple buttons on the portable consumer product. For each of the buttons, the drive assembly may be engaged to move the switch closer to the button assembly until a contact signal is received, indicating that a plunger on the button assembly has engaged a contact in the switch. The drive assembly then may be engaged to move the switch further from the button assembly for a particular distance. This distance may equal one of the preselected back off distances corresponding to the switch type.

In another embodiment, a computer readable medium for storing in non-transitory tangible form computer instructions executable by a processor is provided for assembling a portable consumer product. The computer readable medium can include computer code that controls various automated assembly machines, such as robotic arms and automatic screwdrivers. The computer code may include computer code for altering a tactile response of a first mechanical actuator by moving a first switch assembly closer to the first mechanical actuator using a first screw drive until a contact signal is received, wherein the contact signal indicates contact between a contact point in the first switch assembly and the first mechanical actuator and adjusting the tactile response of the first mechanical actuator by moving the first switch assembly further from the first mechanical actuator using the first screw drive so that a particular actuator travel distance is realized when the first mechanical actuator is depressed, as well as computer code for altering the tactile response of at least a second mechanical actuator by altering the actuator travel distance of the second mechanical actuator to match the particular actuator travel distance.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
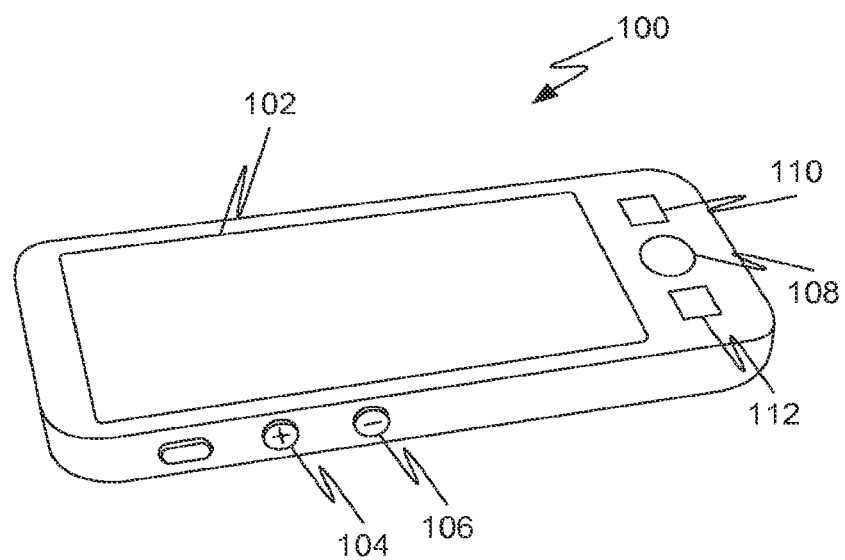
FIG. 1 is a diagram illustrating a representative consumer product in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Broadly speaking, the embodiments disclosed herein describe a process for characterizing a tactile response of a first mechanical actuator (e.g., button) based on a back off distance. Specifically, the first mechanical actuator may include a plunger, a dome-shaped flexible membrane, and an electrical contact, all aligned with each other so that a contact signal is generated when the flexible membrane (driven by the plunger) touches the contact. The plunger can be moved a first distance towards the contact until the contact signal is generated at a contact point. Then the plunger can be backed off a second distance from the contact point. This second distance may be called the "back off distance". The particular feel of the first mechanical actuator can then be correlated to a particular back off distance. This process can be repeated a number of times to classify a number of different "feels" for the first mechanical actuator based on a number of different buck off distances.

At assembly time, a particular back off distance can be selected based on a desired feel. This particular back off distance may be utilized for one or more mechanical actuators in a consumer device that are essentially the same type as the first mechanical actuator. This gives those mechanical actuators a similar desired feel. Thus, not only can this process be used to provide a particular feel for one or more buttons of a consumer device, it can be used to make similar buttons all feel similar, while also eliminating any "slack" distance(s) that would ordinarily give the consumer device a "cheap" feel.

During the assembly process itself, the back off distance can be set for each of the mechanical actuators by using a screw drive to drive a switch assembly (which includes the dome-shaped flexible membrane and the electrical contact) corresponding to each mechanical actuator towards a plunger of a first mechanical actuator, until a contact signal is generated at a contact point (when the dome-shaped flexible membrane is compressed so far by the plunger that the dome-shaped flexible membrane touches the electrical contact). Then the screw drive is used to drive the switch assembly back away from the plunger a distance equal to the predesignated back off distance. This process can be repeated for other mechanical actuators on the consumer device, with the same back off distance, to ensure that the feel across the multiple mechanical actuators is essentially the same, despite the fact that each of the multiple mechanical actuators may have different amounts of slack caused by their respective tolerance stacks.

FIG. 1 is a diagram illustrating representative consumer product 100 in accordance with the described embodiments. Consumer product 100 can take many forms, not the least of which includes a portable media player such as an iPod™, smartphone such as an iPhone™, and a tablet computer such as an iPad™, each manufactured by Apple Inc. of Cupertino, Calif. Consumer product 100 can have any number of features that can be used to receive user inputs to, for example, control or influence operations of consumer product 100. For example, consumer product 100 can include touch sensitive display 102 configured to present virtual control features as visual content that can assist a user in controlling selected functions performed by consumer product 100. For example, a graphical user interface having various icons can be presented, each of which can be used to control or at least influence selected functions. In addition to virtual control features, various mechanical control features such as mechanical inputs 104-112 can be used to provide additional control features.

Mechanical inputs 104-112 can take many forms such as a button, slider, toggle switch, and so on. For the remainder of this discussion, however, mechanical inputs 104-112 take the form of depressible buttons 104. Unlike the virtual control features presented by display 102, mechanical button assemblies are designed to physically move when depressed by a user. Typically, these button assemblies include a shaft and a plunger, where the plunger acts to engage a contact when the button assembly is depressed and moved far enough for the plunger to strike the contact.

Figure 2:
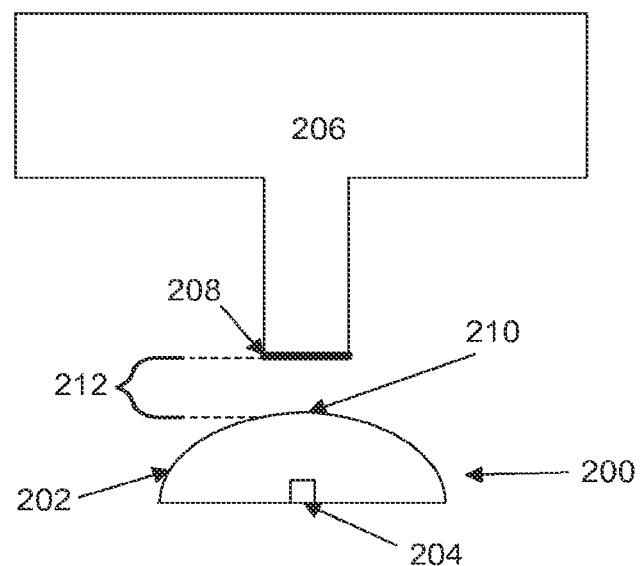
FIG. 2 is a diagram illustrating a representative dome switch.

Dome switches are common in modern consumer devices, especially portable consumer devices. FIG. 2 is a diagram illustrating a representative dome switch. Switch assembly 202 has a dome membrane 202 formed in a shape of a dome, with a contact 204 in the center of the dome. Contact 204, when engaged, sends an electrical contact signal. While contact 204 sends the signal in electrical form, the structure of contact itself may be either electrical in nature, such as, for example, a touch-sensitive switch, or may be mechanical in nature, such as a physical switch that has moving parts that engage other parts of the switch to activate the contact. When a button assembly 206 is depressed, a plunger 208 strikes apex 210 of dome membrane 202, which begins to compress. Apex 210 represents the highest point on the dome membrane (when the dome membrane is facing upwards). Plunger 208 continues to move and compress apex 210 of dome membrane 202 until contact 204 is struck.

The properties of dome membrane 202 (e.g., stiffness of the membrane material, shape of the membrane) can greatly affect the feel of the button. Generally, stiff materials can result in a harsher feel, while softer materials can result in a softer feel. The size and shape of dome membrane 202, however, can also affect its feel. Nevertheless, even when dome membranes that are essentially the same are used and button assemblies that are essentially the same are also used, there still can be a difference in the feel of multiple buttons on a device due to the tolerance stack of the button assemblies. The tolerance stack can lead to a certain distance of "slack" 212 between the location of plunger 208 when the user first depresses button assembly 206, and apex 210 of membrane 202. The difference in feel between buttons that are essentially the same can be distracting to a user, especially when the buttons are located on the same consumer device and are in proximity to each other. Additionally, this difference in feel can convey an impression of a poorly constructed or otherwise low quality device. Conversely, when buttons all have substantially similar feels, the impression is of a well constructed, high quality device.

Figure 3:
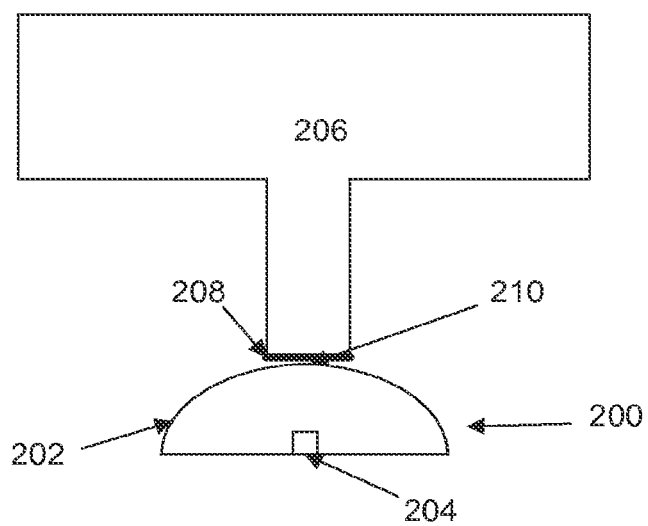
FIG. 3 is a diagram illustrating the representative dome switch as the plunger strikes the apex of the dome membrane.
Figure 4:
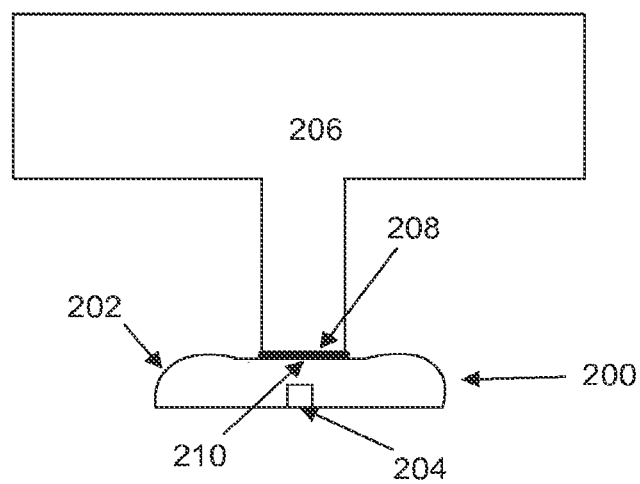
FIG. 4 is a diagram illustrating the representative dome switch as the dome membrane reaches its maximum compressive force.
Figure 5:
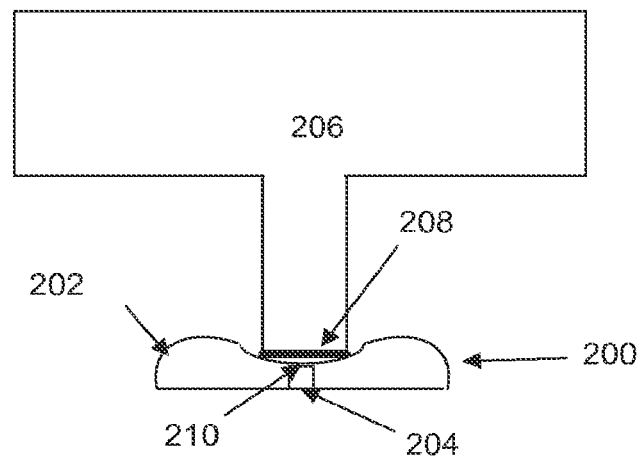
FIG. 5 is a diagram illustrating the representative dome switch as the contact is struck.

FIG. 3 is a diagram illustrating the representative dome switch of FIG. 2 as plunger 208 strikes apex 210 of dome membrane 202. At this point, dome membrane 202 begins to compress, and the compressive force required to continue to compress it continues to increase. FIG. 4 is a diagram illustrating the representative dome switch as dome membrane 202 reaches its maximum compressive force. At this point, dome membrane begins to flatten out, and the compressive force required to continue to compress it begins to decrease. FIG. 5 is a diagram illustrating the representative dome switch as contact 204 is struck. Here, plunger 208 has compressed dome membrane 202 so much that dome membrane 202 touches contact 204, causing contact 204 to generate a contact signal.

Figure 6:
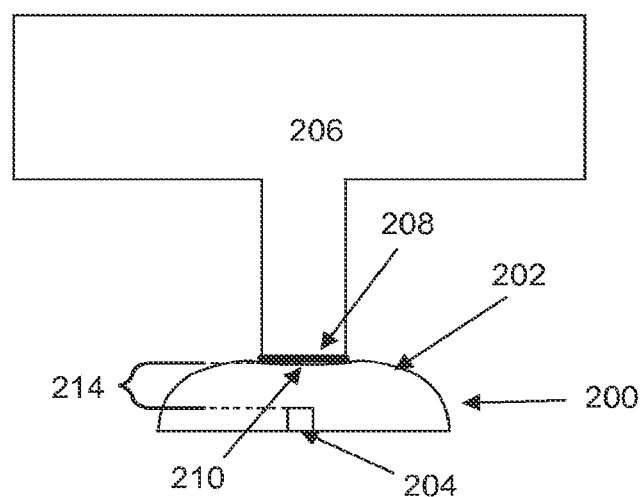
FIG. 6 is a diagram illustrating a representative dome switch after the dome switch has been backed away from the plunger a distance equal to the back off distance.

Once contact 204 generates a contact signal, plunger 208 can be backed off. FIG. 6 is a diagram illustrating a representative dome switch after the dome switch has been backed away from the plunger a distance equal to the back off distance. Here, back off distance 214 is depicted as being slightly less than the distance that would be needed to have dome membrane 202 return all the way to its original shape. Thus, back off distance 214 in this example not only eliminates any slack distance, but also essentially "pre-engages" dome membrane 202, giving the button a different feel than if plunger 208 were to start from a position that allowed dome membrane 208 to begin at its original shape. As will be described later, various different back off distances can be tested and correlated to different "feels" for the button. Later, at assembly time, a particular back off distance can be selected, and that back off distance can be utilized for one or more of the buttons in a consumer product.

Figure 7:
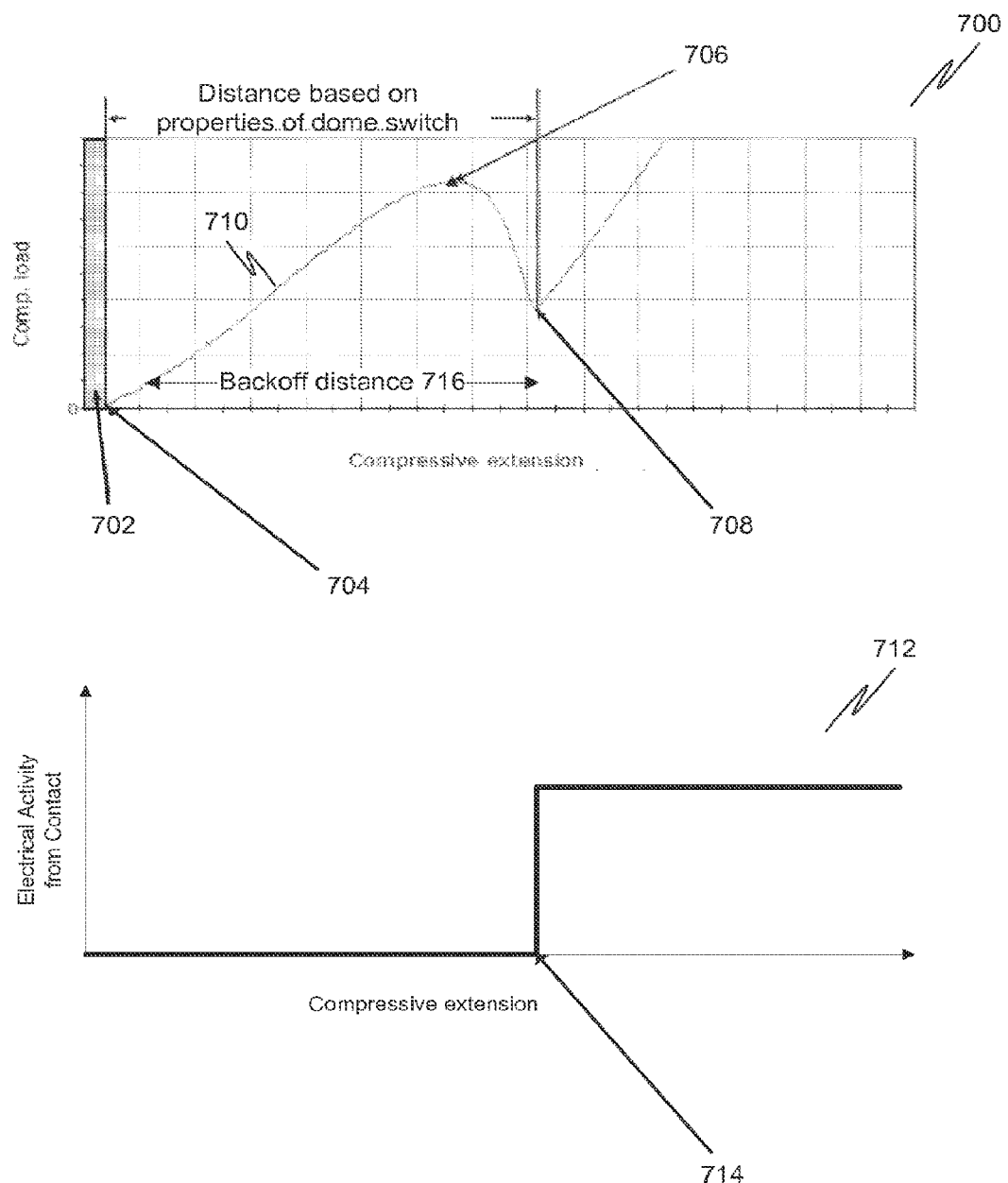
FIG. 7 shows two graphs related to a distance traversed by a button assembly in accordance with various embodiments.

FIG. 7 shows two graphs related to a distance traversed by a button assembly in accordance with various embodiments. Graph 700 depicts the tactile response of a dome switch as a function of the distance a plunger has been driven towards and into the apex of a dome membrane. As can be seen, there is a certain distance (compressive extension) at which the plunger is moved where there is little or no tactile response of the dome switch. This is known as "slack" 702. This area varies based on the tolerance of the parts within the switch and the parts in the system. During the traversal of this slack distance, the user depressing the button feature attached to the plunger feels little or no resistance or counterforce (compressive load). The result is that the button feels "loose". Many users equate such a "loose" feel with poor quality construction, making the device feel "cheap." Thus, it is desirable to reduce or eliminate the slack distance. At point 704, the plunger strikes the apex of the dome membrane, and the tactile response (i.e., resistance or counterforce) begins to increase until the dome membrane is compressed so much it begins to "flatten out", at point 706. At that point, the tactile response decreases until at point 708, the contact is engaged.

The points on this graph and the curve of the graph may vary based on the types of buttons utilized. A change in the membrane material to a stiffer material, for example, would cause point 706 to be much higher on the y-axis due to the increase in tactile response as the dome membrane is compressed. This is because a stiffer material requires a greater compressive force to cause the dome material to move from point 702 to 708, thereby increasing the slope of line 710. Conversely, a more flexible material can cause the slope of line 710 to decrease due to the lower compressive force required to move from point 702 to 708. Nevertheless, it may be presumed that for button features that are essentially the same with dome switches that are also essentially the same, that the curve and points following the point 704 will be essentially the same. The only difference will be the slack distance 700 caused by the tolerance stack of the components. Graph 712 depicts the electrical activity of a contact of the dome switch as a function of the distance the plunger has been driven towards and into the apex of the dome membrane. As can be seen, the electrical activity is zero until point 714, at which the plunger engages the contact, As described above, in various embodiments, at assembly time, the dome switch is driven towards the plunger until such point as the contact is engaged. This is detected based on the electrical activity of the contact. Therefore, the dome switch can continue to be driven (no matter the distance) until electrical activity is detected in the contact. At that point, the dome switch can back off the plunger a fixed distance. This distance may be equal to a selected back off distance 716. As is described elsewhere in this document, the back off distance can be selected based upon a desired feel for the button. In this way, one can "characterize" a particular switch for "feel" simply by varying the back off distance and seeing how the button feels, prior to assembly time. Generally speaking, once the switch is backed off to past point 706, then the greater the distance, the "softer" the feel of the button, while the smaller the distance, the "harder" the feel of the button. However, this may vary based on the type of material used and the shape of the material.

Figure 8:
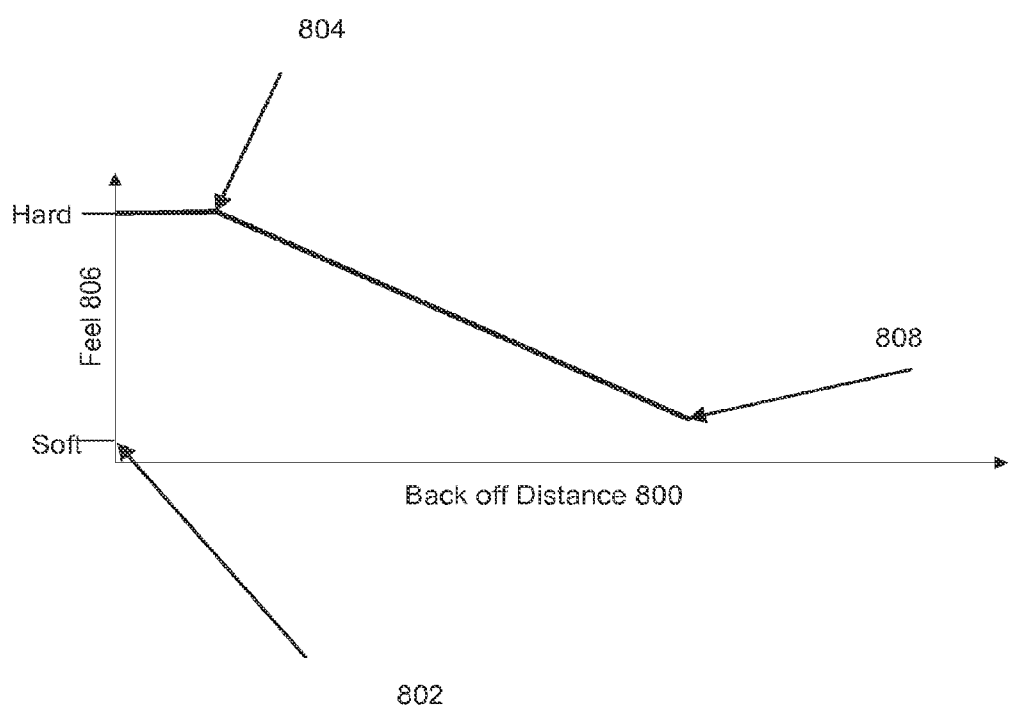
FIG. 8 is a diagram illustrating a representative graph generated for a particular dome switch type.

During the characterization stage, a variety of different graphs can be generated, each corresponding to a different "type" of dome switch. In this case, dome switches that are essentially the same "type" will have essentially the same dome membrane material, essentially the same dome size, and essentially the same dome shape. FIG. 8 is a diagram illustrating a representative graph generated for a particular dome switch type. Note that as the back off distance 800 increases, the further the plunger moves from the contact point (i.e., the point at which the plunger causes the dome membrane to touch the contact). Additionally, as back off distance 800 moves from contact point 802 to the point at which the switch is at its maximum operating force 804, the feel 806 is largely constant. Once point 804 is reached, however, the feel 806 significantly decreases in hardness, to a point of minimum hardness at point 808, where the plunger is at the apex of the dome.

Figure 9:
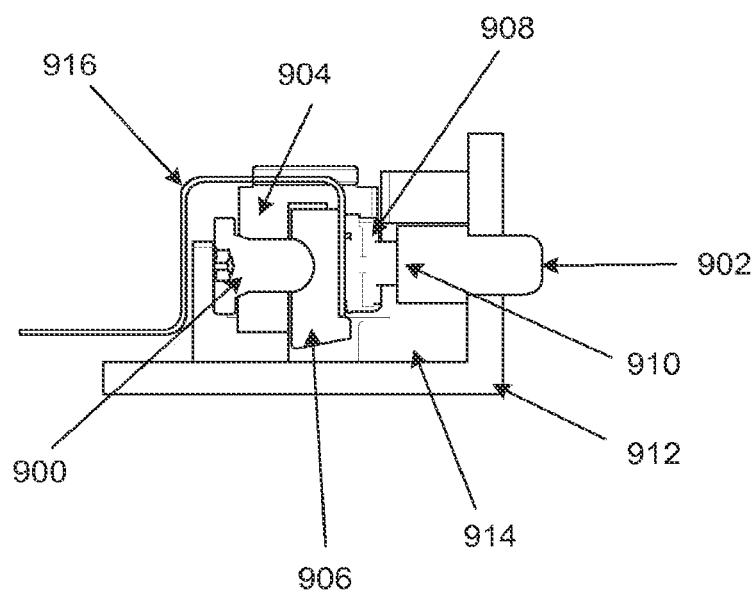
FIG. 9 is a diagram illustrating a cross section of a mechanical actuator in accordance with a first embodiment.

FIG. 9 is a diagram illustrating a cross section of a mechanical actuator in accordance with a first embodiment. In this embodiment, an adjustment screw 900 moves inline with a button feature 902. Moving adjustment screw 900 in (i.e., screwing in) through screw block 904 causes guide plate 906 to strike switch 908, which then causes switch 908 to move towards button feature 902 (more particularly, towards plunger 910 of button feature 902). This results in first reducing the distance between switch 908 and plunger 910, until such a point that switch 908 strikes plunger 910. In the case of a dome switch, at this point plunger 910 strikes the apex of the dome membrane, and the dome membrane begins to compress. This movement continues until a contact is engaged, at which point adjustment screw 900 can be moved in the opposite direction (i.e., screwed out, or unscrewed). Adjustment screw 904, screw block 906, and guide plate 900 may be collectively referred to as a "screw drive". Also pictured in this figure are enclosure 912, frame 914, and circuit board 916.

This slack distance, if any, is different among the multiple buttons due to the tolerance stack of each button. Thus, the distance switch 908 travels until the contact is engaged can vary from button to button. Following detection of the contact, screw 900 is operated in the reverse direction, backing switch 908 away from plunger 910. The distance travelled in the reverse direction is programmed to be essentially the same for each of the buttons. This results in a uniform feel among the multiple buttons despite the fact that the slacks of the respective buttons may originally have varied. The distance traveled in the reverse direction can also be set based on the known properties of the dome membranes in order to minimize or eliminate slack between the plunger and the apex of the membrane. It can also be set based on tests to determine the best overall "feel" of a button. For example, it may be beneficial to have the plunger essentially pre-engaging the switch by slightly depressing the apex of the dome membrane even before the user depresses the button.

The screw drive itself may vary in its configuration. In the embodiment described above, the screw drive includes a manual screw, also known as a set screw, that can be driven via the use of a screwdriver to move the plunger closer to or further away from the membrane of the dome switch. While such a screw can be manually driven by an assembler, it is preferable for the screw to be driven by a machine-operated automatic screwdriver, as this can be used to ensure that the distances traveled in the reverse direction (i.e., unscrewed) are essentially the same across multiple buttons. In embodiments using a machine-operated automatic screwdriver, the distance the plunger travels may be measured by the number of threads that have been turned during the screwing process. The distance may be calculated based on this number of turned threads and the thread size of the screw, which is a known quantity.

In another embodiment, the screw drive itself is electrically controlled. Here, the screw drive may include a servo that operates to move the plunger when electrical power is supplied to it. In this embodiment, the distance may also be calculated based on the number of turned threads, although other distance calculations are possible, such as measuring the amount of time electrical power is supplied to the screw drive. In yet another embodiment, another type of driving mechanism is utilized to drive the switch assembly towards the plunger, in lieu of a screw drive. There may be many different types of driving mechanisms that can perform this function. As an example, a drive mechanism may be provided that performs a direct "pushing or pulling" action in lieu of a screwing action. Examples of such mechanisms include hydraulic and pneumatic drives, among others.

Figure 10:
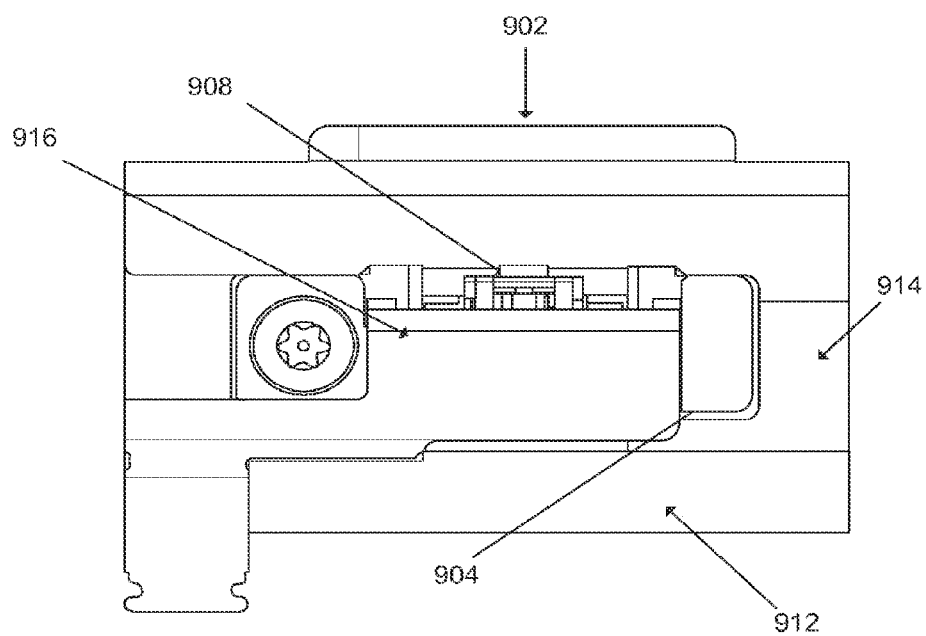
FIG. 10 is a diagram illustrating a back side of the mechanical actuator in accordance with the first embodiment.
Figure 11:
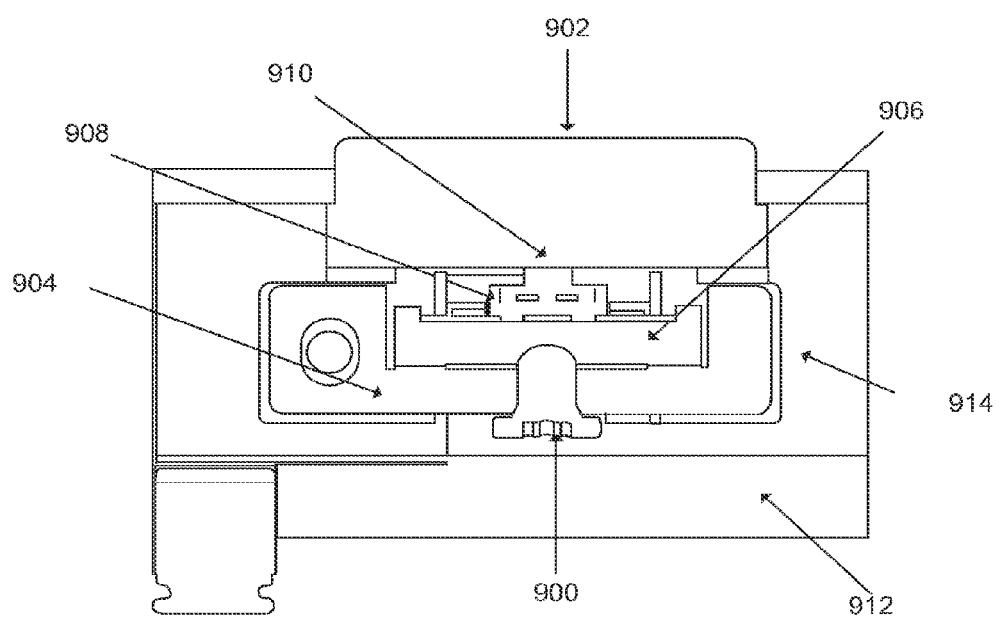
FIG. 11 is a diagram illustrating a top view of the mechanical actuator in accordance with the first embodiment.
Figure 12:
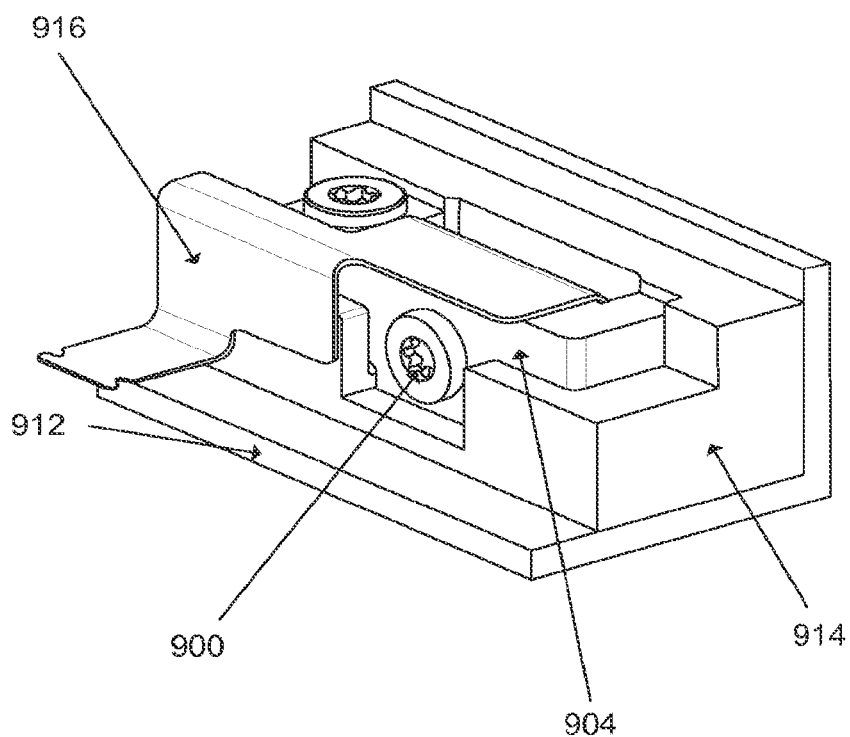
FIG. 12 is a diagram illustrating a top perspective view of the mechanical actuator in accordance with the first embodiment.

FIG. 10 is a diagram illustrating a back side of the mechanical actuator in accordance with the first embodiment. FIG. 11 is a diagram illustrating a top section view of the mechanical actuator in accordance with the first embodiment. This perspective provides a better view of guide plate 900 and switch 908. FIG. 12 is a diagram illustrating a top perspective view of the mechanical actuator in accordance with the first embodiment.

Figure 13:
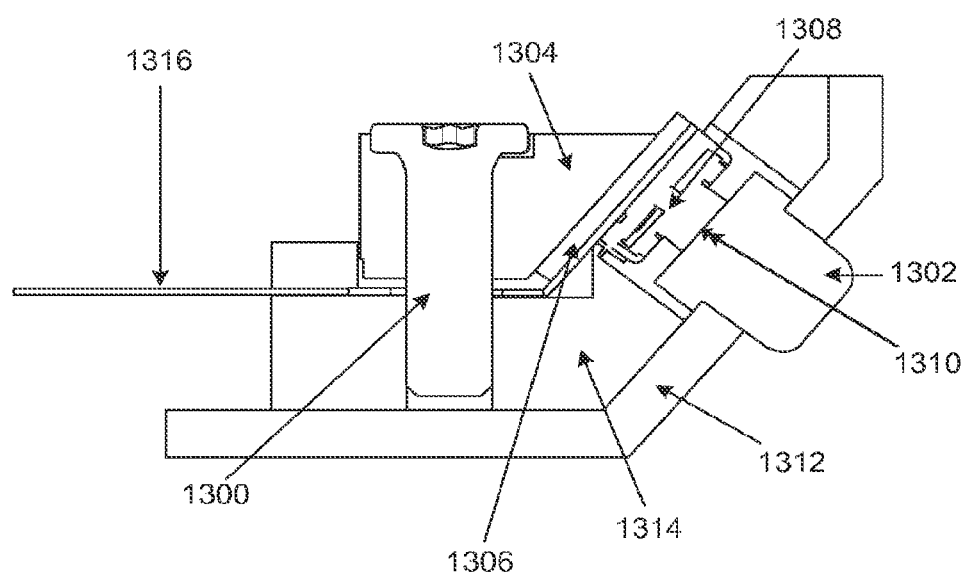
FIG. 13 is a diagram illustrating a cross section of a mechanical actuator in accordance with a second embodiment.
Figure 14:
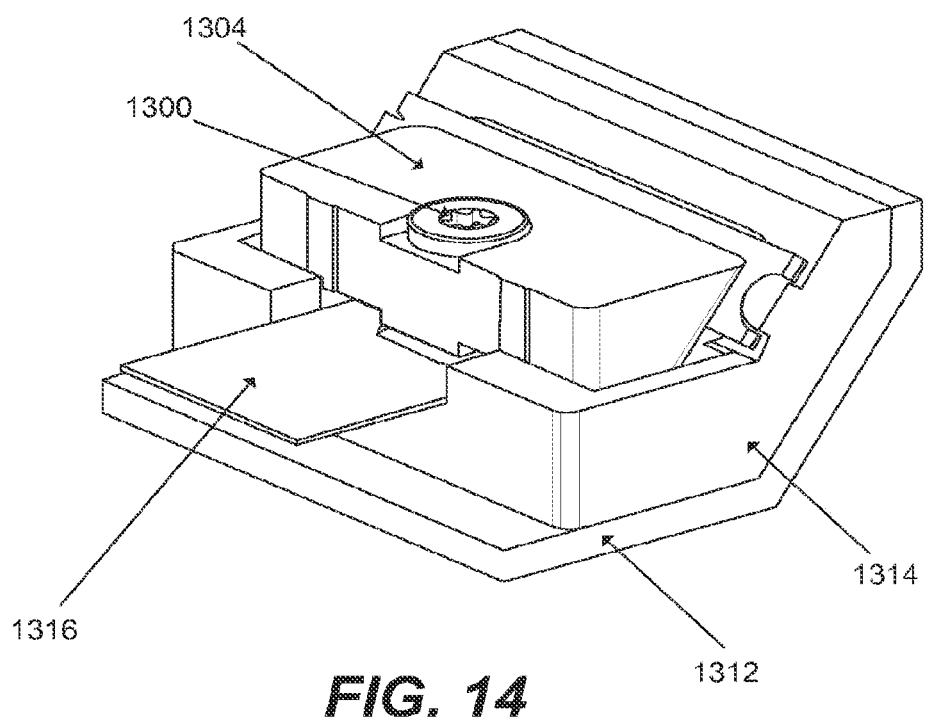
FIG. 14 is a diagram illustrating a top perspective view of the mechanical actuator in accordance with the second embodiment.

FIG. 13 is a diagram illustrating a cross section of a mechanical actuator in accordance with a second embodiment. In this embodiment, adjustment screw 1300 moves transaxially to button feature 1302. This is accomplished via the use of a wedge-shaped screw block 1304. Moving adjustment screw 1300 in causes screw block 1304, and more particularly guide plate 1306, to strike switch 1308 to move it towards plunger 1310 of button feature 1302. Like in FIGS. 9-12, this results in first reducing the distance between a switch 1308 (which in this embodiment is a dome switch) and plunger 1310, until such a point that dome switch 1308 strikes plunger 1310, and the membrane of the dome switch begins to compress. This movement continues until a contact is engaged, at which point the screw drive 1300, 1304, 1306 can be moved in the opposite direction (i.e., screwed out, or unscrewed). Also pictured in this figure are enclosure 1312, frame 1314, and circuit board 1316. FIG. 14 is a diagram illustrating a top perspective view of the mechanical actuator in accordance with the second embodiment. In some embodiments of the mechanical actuator, the transaxial embodiment described in FIGS. 13-14 may be preferable if a set screw embodiment is used, as it may be easier to engage the set screw using a screwdriver if the screw is not parallel with the button, as fewer components may be in the way of the screwdriver. However, the direction of the screw drive may vary based on the orientation and configuration of the button assembly, and the device in which it is located.

Figure 15:
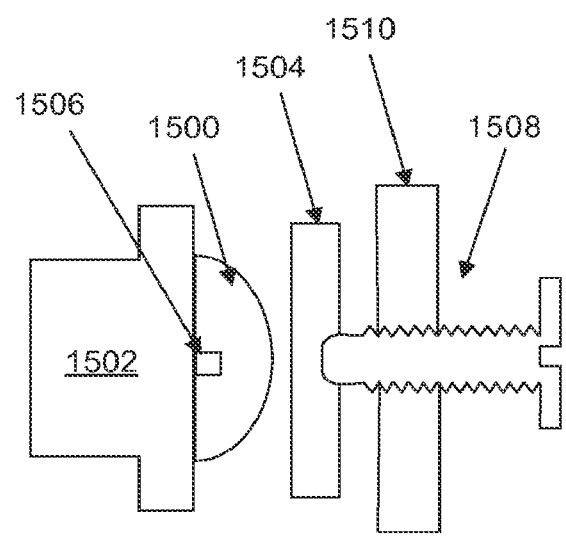
FIG. 15 is a diagram illustrating another embodiment.

FIG. 15 is a diagram illustrating a reverse dome switch embodiment. In this embodiment, reverse dome switch 1500 is affixed to button feature 1502 (possibly supported by a PCB). When a user depresses button feature 1502, dome switch 1500 moves towards adjustment plate 1504, and it is actually adjustment plate 1504 that causes dome switch 1500 to depress to the point that contact 1506 is engaged. Adjustment screw 1508 is screwed in and out of fixed screw block 1510, causing adjustment plate 1504 to move closer to or further away from dome switch 1500. Adjustment of the tactile feel of buttons constructed in this manner may be performed in a similar manner as described above with respect to other embodiments. The only difference is that adjustment screw 1508 causes adjustment plate 1504 to move rather than the switch 1500.

Figure 16:
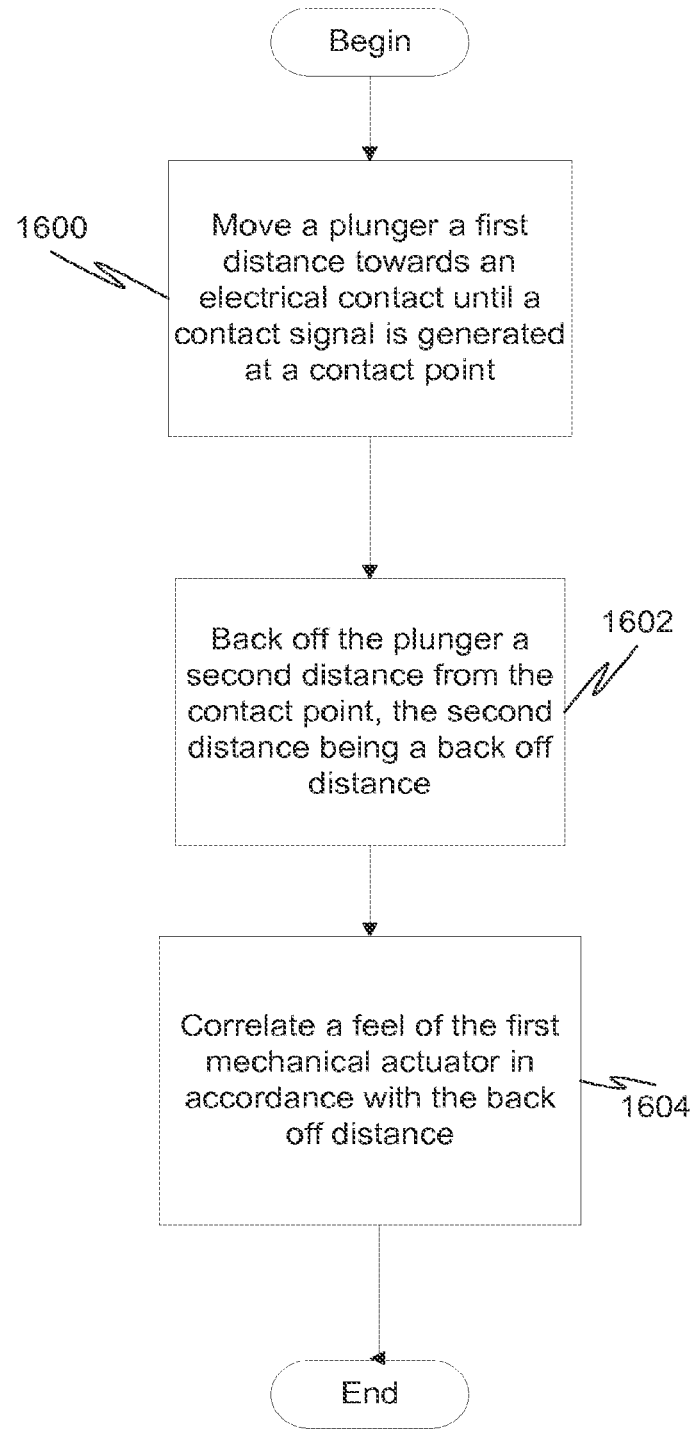
FIG. 16 is a flow diagram illustrating a method for characterizing a tactile response of a first mechanical actuator in accordance with an embodiment.

FIG. 16 is a flow diagram illustrating a method for characterizing a tactile response of a first mechanical actuator in accordance with an embodiment. At 1600, a plunger of the first mechanical actuator is moved a first distance towards an electrical contact until a contact signal is generated at a contact point. At 1602, the plunger is backed off a second distance from the contact point, the second distance being a back off distance. At 1604, a feel of the first mechanical actuator is correlated in accordance with the back off distance.

Figure 17:
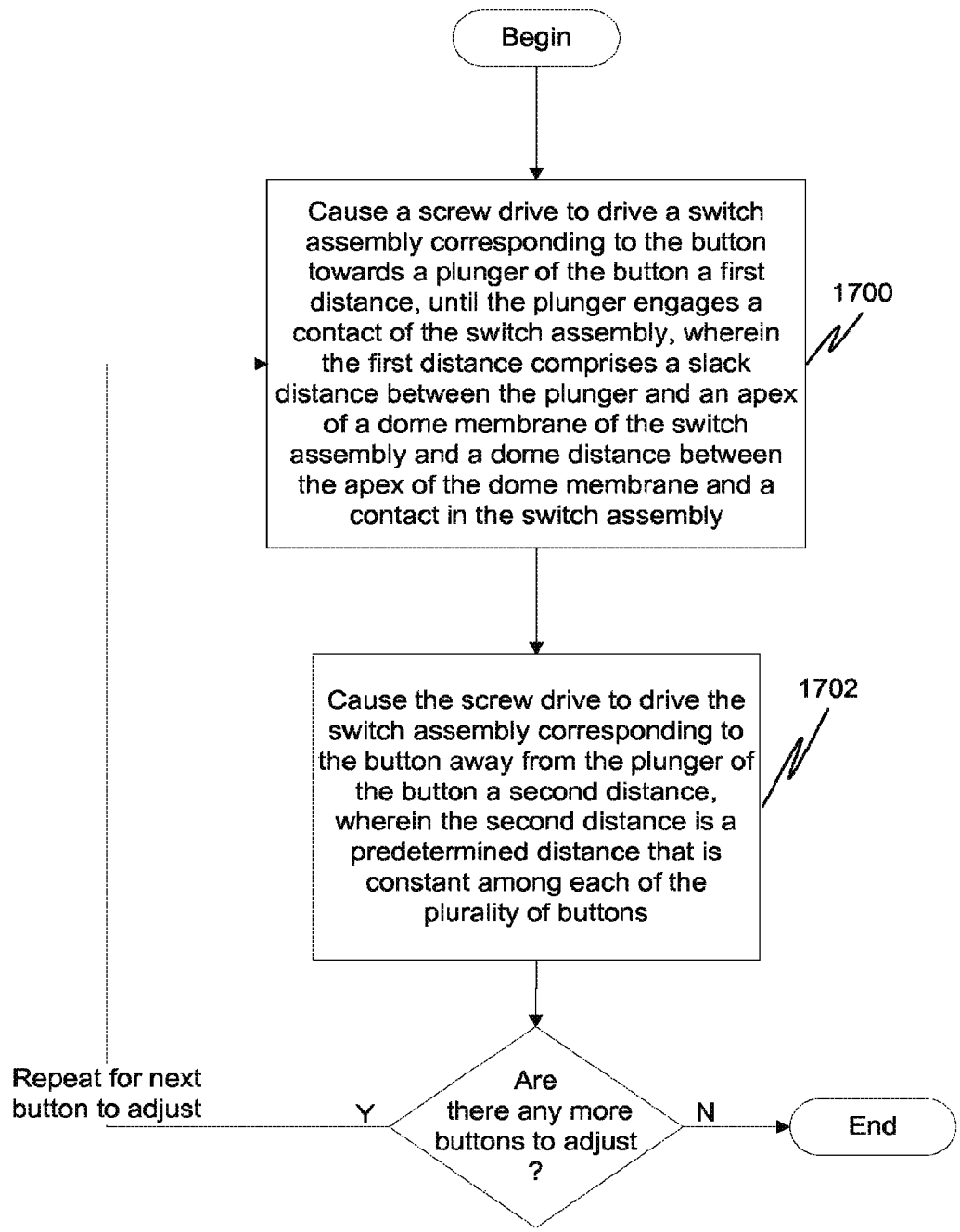
FIG. 17 is a flow diagram illustrating a method for adjusting tactile feel of multiple buttons on a device in accordance with an embodiment.

FIG. 17 is a flow diagram illustrating a method for adjusting tactile feel of multiple buttons on a device in accordance with an embodiment. Here, steps 1700-1702 are repeated for each of the multiple buttons. At 1700, a screw drive is caused to drive a switch assembly corresponding to the button towards a plunger of the button a first distance, until the plunger engages a contact of the switch assembly, wherein the first distance is a slack distance between the plunger and an apex of a dome membrane of the switch assembly and a dome distance between the apex of the dome membrane and a contact in the switch assembly. At 1702, the screw drive is caused to drive the switch assembly corresponding to the button away from the plunger of the button a second distance, wherein the second distance is a predetermined distance that is constant among each of the multiple buttons.

Figure 18:
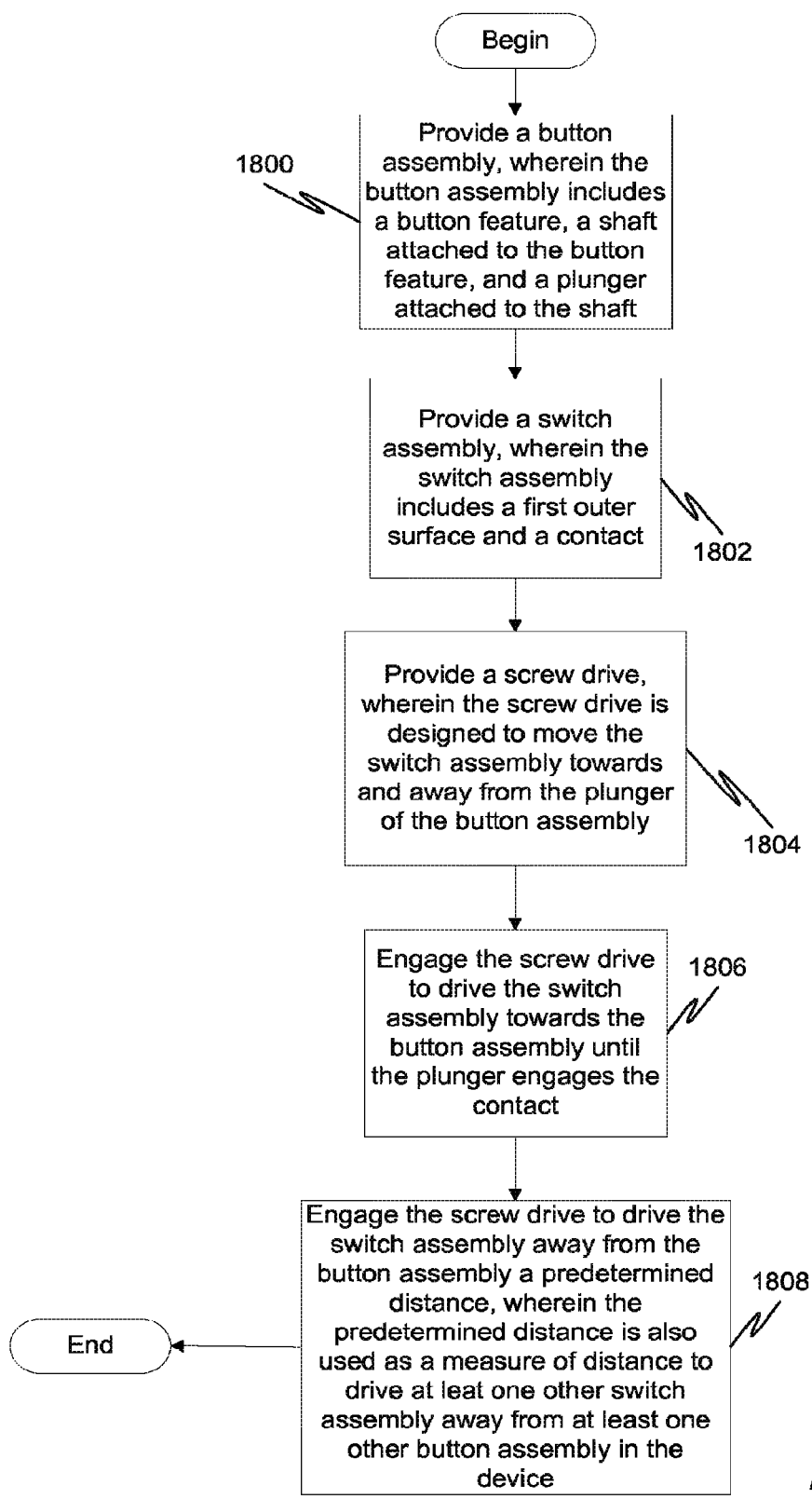
FIG. 18 is a flow diagram illustrating a method for assembling a device in accordance with an embodiment.

FIG. 18 is a flow diagram illustrating a method for assembling a device in accordance with an embodiment. At 1800, a button assembly is provided, wherein the button assembly includes a button feature, a shaft attached to the button feature, and a plunger attached to the shaft. At 1802, a switch assembly is provided, wherein the switch assembly includes a first outer surface and a contact. At 1804, a screw drive is provided, wherein the screw drive is designed to move the switch assembly towards and away from the plunger of the button assembly. At 1806, the screw drive is engaged to drive the switch assembly towards the button assembly until the plunger engages the contact. At 1808, the screw drive is engaged to drive the switch assembly away from the button assembly a predetermined distance, wherein the predetermined distance is also used as a measure of distance to drive at least one other switch assembly away from at least one other button assembly in the device.

In another embodiment, a computer-readable medium is provided that includes computer program instructions for performing the various steps of assembly of the device. Specifically, the computer program instruction may act to control various automatic installation and/or assembly components, such as, for example, robotic aims, automatic screwdrivers, etc. that can assemble the device without the need for human intervention (or, at least, minimizing human intervention). In this way, the computer instructions may be programmed to control a machine to alter a tactile response of a first mechanical actuator by moving a first switch assembly closer to the first mechanical actuator using a first screw drive until a contact signal is received, wherein the contact signal indicates contact between a contact point in the first switch assembly and the first mechanical actuator and adjusting the tactile response of the first mechanical actuator by moving the first switch assembly further from the first mechanical actuator using the first screw drive so that a particular actuator travel distance is realized when the first mechanical actuator is depressed, as well as altering the tactile response of at least a second mechanical actuator by altering the actuator travel distance of the second mechanical actuator to match the particular actuator travel distance.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

This invention claimed is:

1. An input assembly, comprising:
   a depressable button;
   an adjustment plate; and
   a reverse dome switch in mechanical contact with the depressable button, comprising:
      a contact, and a flexible dome, wherein the adjustment plate pre-engages the flexible dome such that the contact and the flexible dome are separated by a back off distance, the back off distance being that distance that the depressable button moves to activate the reverse dome switch.

2. The input assembly as recited in claim 1, further comprising:
   a screw drive mechanically coupled to the adjustment plate, the screw drive used to modify an amount of the pre-engagement between the flexible dome and the adjustment plate.

3. The input assembly as recited in claim 2, further comprising a device, the device comprising a plurality of the input assemblies.

4. The input assembly as recited in claim 2, wherein the screw drive is operable to drive the adjustment plate towards the contact of the reverse dome switch until a contact signal is received, and then to drive the adjustment plate away from the contact of the reverse dome switch the back off distance.

5. The input assembly as recited in claim 2, wherein the screw drive comprises a screw, and wherein the back off distance is calculated based on a number of threads of the screw.

6. The input assembly as recited in claim 2, wherein the screw drive comprises a screw, and wherein the back off distance is calculated based on a size of the screw.

7. A device for characterizing a switch, the device comprising:
   a circuit board;
   a frame;
   a button feature comprising a plunger;
   an adjustment screw operable to move in line with the button feature;
   a screw block engaged with the adjustment screw;
   a switch comprising at least one electrical contact;
   a guide plate located adjacent to the screw block and the switch and engaged with the adjustment screw such that movement of the adjustment screw causes the guide plate to contact the switch; and an enclosure comprising at least the button feature, the adjustment screw, the screw block, the switch, the guide plate, the circuit board, and the frame.

8. The device of claim 7, wherein the adjustment screw is operable to move through the screw block in a first direction and a second direction, the first direction corresponding to the switch moving towards the button feature and the second direction corresponding to the switch moving away from the button feature.

9. The device of claim 7, the switch further comprising a flexible dome membrane.

10. The device of claim 9, wherein the flexible dome membrane is backed away from the plunger by a back off distance.

11. The device of claim 10, wherein the back off distance is less than the distance that would be needed to have the flexible dome membrane return to its original shape.

12. The device of claim 7, further comprising a screw drive operable to modify the back off distance by driving the guide plate towards the contact of the switch until a contact signal is received, and in response to the contact being received, driving the guide plate away from the contact of the flexible dome membrane by the back off distance.

13. The device of claim 10, wherein the back off distance is used as a predetermined back off distance of a second flexible dome membrane associated with a second button feature.

14. The input assembly as recited in claim 2, wherein the back off distance is used as a predetermined back off distance of a second screw drive associated with a second button.

15. The device of claim 10, wherein the back off distance is calculated based on a number of threads of the adjustment screw.

16. The device of claim 10, wherein the back off distance is calculated based, at least in part, on a size of the adjustment screw.

17. A method comprising:
   providing a depressable button;
   providing an adjustment plate; and
   placing a reverse dome switch in mechanical contact with the depressable button, wherein the reverse dome switch comprises a contact and a flexible dome, and wherein the adjustment plate pre-engages the flexible dome such that the contact and the flexible dome are separated by a back off distance, wherein the back off distance is a distance that the depressable button moves when activating the reverse dome switch.

18. The method of claim 17, further comprising:
   providing a screw drive; and
   coupling the screw drive to the adjustment plate, wherein the screw drive modifies an amount of the pre-engagement between the flexible dome and the adjustment plate.

19. The method of claim 17, wherein the screw drive is operable to drive the adjustment plate towards the contact of the reverse dome switch until a contact signal is received.

20. The method of claim 19, wherein the screw drive is operable to drive the adjustment plate away from the contact of the reverse dome switch, wherein a distance the adjustment travels is equivalent to the back off distance.

* * * * *